Figure 2:
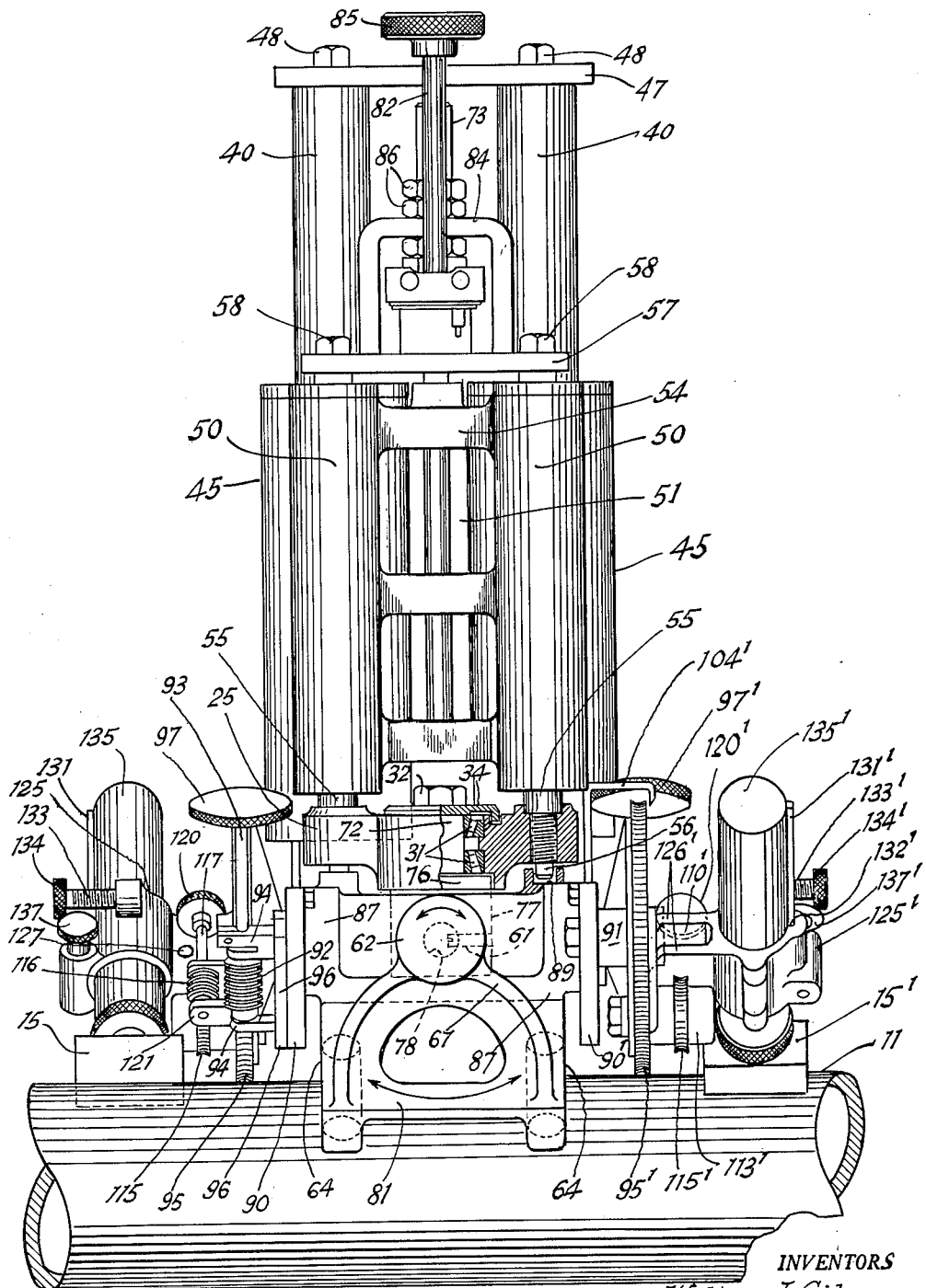

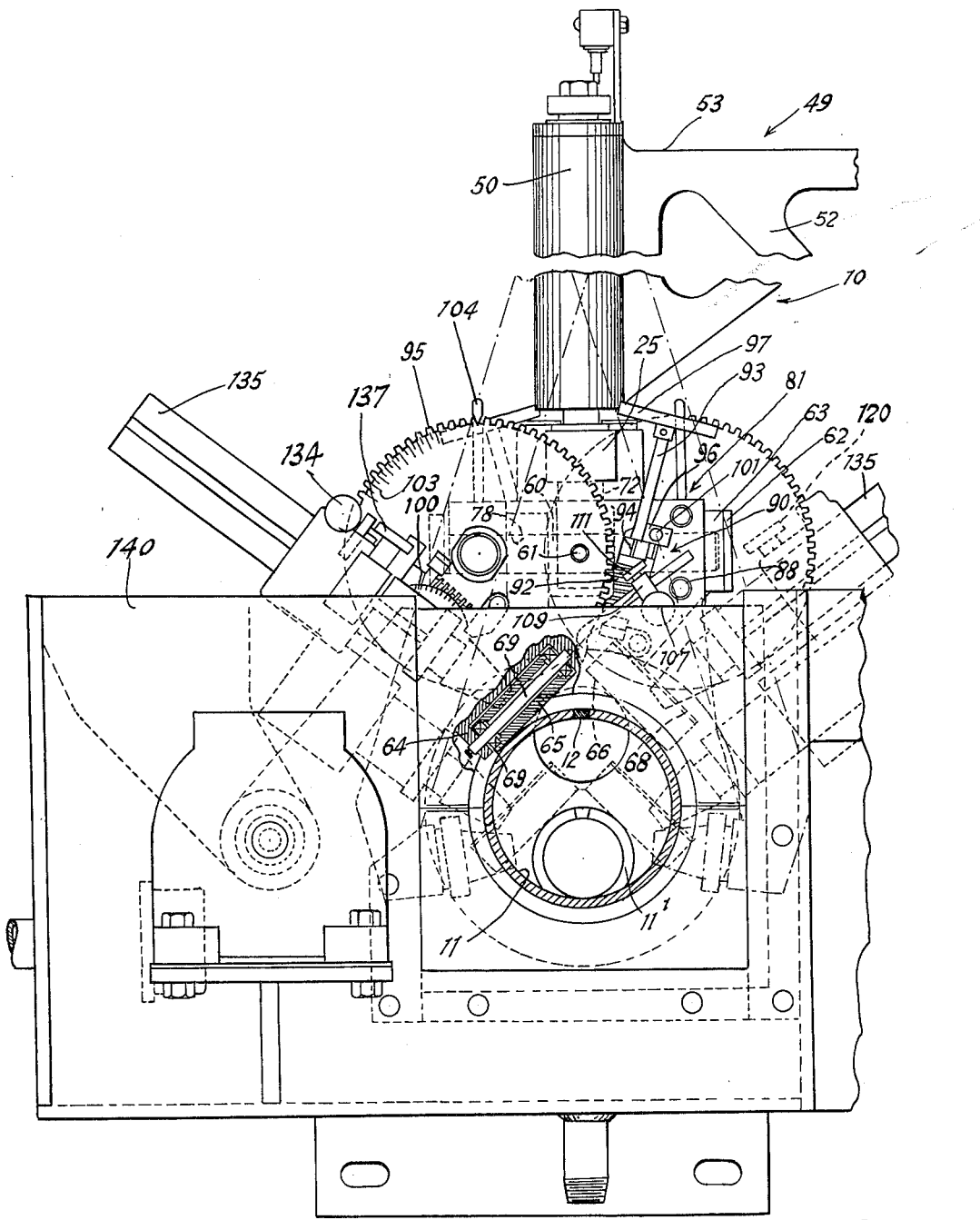
Oct. 2, 1962 W. J. GIBSON ETAL 3,056,285
ULTRASONIC SEARCH TUBE SUPPORT HAVING
MULTIPLICITY OF FOLLOWER MOVEMENTS
Filed Dec. 23, 1958 4 Sheets-Sheet 1
FIG. 1-A
INVENTORS
Walter J. Gibson
BY Albert M. DeStephen
Ernst W. Allardt
*JP Moran* ATTORNEY

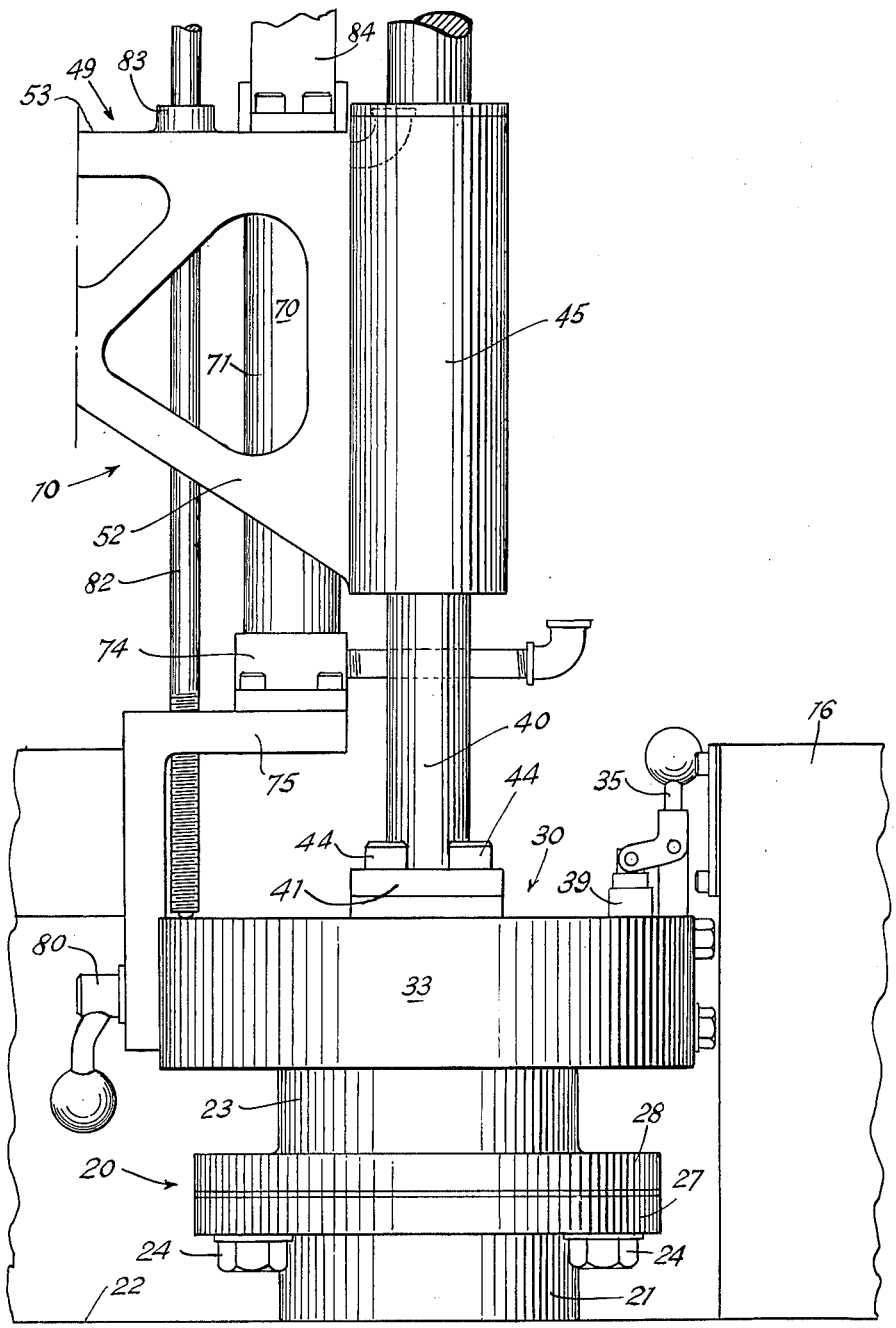
FIG.1-B

INVENTORS
Walter J. Gibson
BY Albert M. DeStephen
Ernst W. Allardt

ATTORNEY

United States Patent Office 3,056,285
Patented Oct. 2, 1962

3,056,285
ULTRASONIC SEARCH TUBE SUPPORT HAVING MULTIPLICITY OF FOLLOWER MOVEMENTS
Walter J. Gibson and Albert M. De Stephen, Alliance, and Ernst W. Allardt, Marlboro, Ohio, assignors to The Babcock & Wilcox Company, New York, N.Y., a corporation of New Jersey
Filed Dec. 23, 1958, Ser. No. 782,592
8 Claims. (Cl. 73—67.8)

This invention relates to apparatus for inspecting the seam weld of electric resistance welded tubing during production of the tubing. More particularly, the invention relates to novel support and manipulating means for the detection means or transducers constructed with a multiplicity of limited free movements so as to maintain the transducers properly oriented with respect to the tubing irrespective of twisting, oscillation, or vertical or lateral movements of the tubing as it is being welded.

In recent years, ultrasonic inspection has become an accepted technique for determining the soundness of welded joints. In this technique, a "beam" of ultrasonic energy is directed into a welded joint by a transmitter and the ultrasonic energy passing through or reflected from the joint is detected by a receiver including means providing a visual indication of the interior of the welded joint and any discontinuities therein.

A known apparatus for ultrasonic inspection of electric resistance welded tubing in a production line includes a tank through which the tubing passes immediately after leaving the welding electrodes, this tank being filled with a suitable liquid, preferably water, to a level above the tubing. The ultrasonic energy is directed into the welded joint by means of a crystal supported on a search tube, and which is accurately oriented and positioned relative to the welded joint. The position and orientation of the crystal relative to the welded tubing must be accurately maintained irrespective of lateral or vertical shifting of the welded tubing as it passes through the tank. In addition, the search tube must be so mounted that it can be readily moved out of operative relation with the tubing, as when terminating a "run" of welded tubing and starting a new "run" thereof. The copending application of Ernst W. Allardt and Albert M. De Stephen, Serial No. 681,091, filed August 29, 1957, shows and describes a novel support and manipulator, for the detection means, which accomplishes the foregoing objectives.

However, while the support and manipulating means of said copending application performs adequately and satisfactorily in service, it has been found that even better inspection results can be obtained by so mounting and constructing the search tube carrier as to provide oscillating and rocking movements thereof of a limited nature. Provision of these movements assures the carrier will follow the welded seam with a much higher degree of precision irrespective of any twisting or buckling of the welded tubing. Thereby, the transducers are maintained in proper orientation with the welded seam with a significantly higher degree of precision and accuracy than has been possible heretofore.

Figure 3:
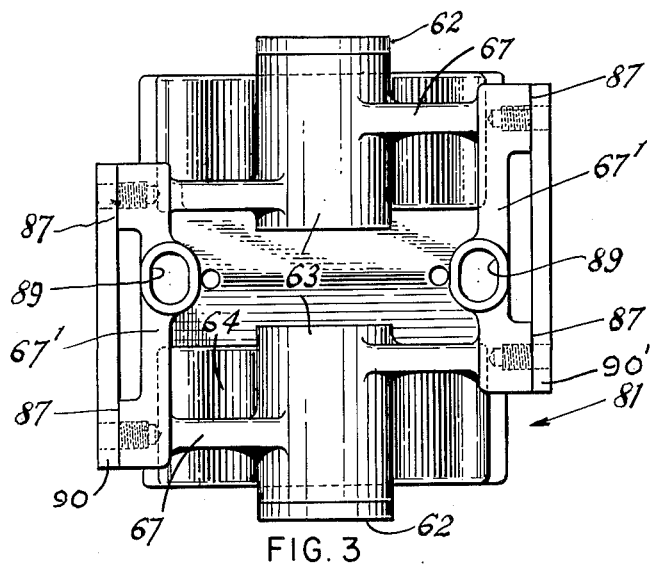
Figures 4, 5:
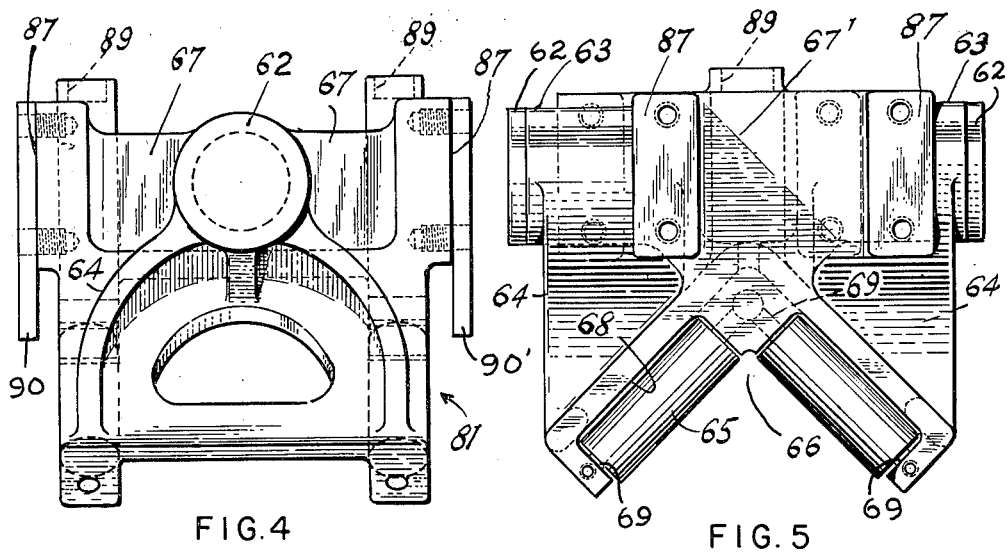

For an understanding of the invention principles, reference is made to the following description of a typical embodiment thereof as illustrated in the accompanying drawings. In the drawings:

FIGS. 1A and 1B together constitute an end elevation view, partly in section, of the support and manipulator;
FIG. 2 is a side elevation view thereof;
FIG. 3 is a plan view of an integral carriage mounting the transducers;
FIG. 4 is a side elevation view of the carriage; and
FIG. 5 is an end elevation view thereof.

The support and manipulator 10 illustrated in the drawings is, in most respects, identical with that shown and described in said Allardt et al. copending application and, as respects such features of identity, will be described generally and not in detail, reference being made to such copending application for illustration and description of the detailed construction. Device 10 differs from the support and manipulator of said copending application by inclusion of the aforementioned provisions for limited oscillation of the search tube carrier about mutually perpendicular axes. It also incorporates the dual transducer mounting arrangement forming the subject matter of the copending application of Walter J. Gibson and Wilson F. Gibbons, Serial No. 782,593, filed simultaneously herewith.

Referring to FIGS. 1A, 1B and 2, the support and manipulator 10 is arranged to be mounted laterally adjacent a production or mill line for electric resistance welded tubing 11 at a position where the tubing emerges from the resistance welder (not shown) and prior to the tubing entering a sizing mill (not shown). Support and manipulator 10 is designed to accurately position and orient an ultrasonic testing device, such as a pair of ultrasonic crystals 15, 15' mounted in search tubes 135, 135' and spaced laterally and longitudinally from each other relative to the resistance weld 12 in tubing 11.

As tubing 11 leaves the resistance welder, it passes through a mill tank 140, containing a liquid such as water to a level sufficient to submerge tubing 11. In passing through tank 140, tubing 11 engages sealing gaskets in the tank end walls to prevent loss of fluid from the mill tank. Support and manipulator 10 is arranged to lift and swing search tubes 135, 135' and crystals 15, 15' between a position in the mill tank 140 in operative relation to tubing 11 and a position in a "test" tank 16 positioned laterally of the mill line in alignment with the mill tank. Test tank 16 has mounted therein a piece or coupon of electric resistance welded tubing having a manufactured or purposeful defect in its resistance weld zone. This defect may, for example, comprise a sawcut 0.010" wide, 0.006" deep, and about ¾" long. This test tubing provides for periodic testing and calibration of the test apparatus while search tubes 135, 135' and crystals 15, 15' are in the test tank so that, when the search tubes and crystals are moved into the mill tank, no further adjustment is needed.

The support and manipulator 10, and mill tank 140, are adapted for operation with tubing of various diameters as indicated by the tubes 11, 11'.

Support and manipulator 10 is positioned for swinging movement about a vertical axis exactly half-way between the center line of the mill line and the center line of the test coupon. For this purpose, a support base 20 is accurately positioned half-way between these center lines. Base 20 comprises a lower section 21, fixed on a horizontal bracket 22 extending laterally of the mill line, and an upper section 23 secured to section 21 by headed studs 24 extending through slots in a flange 27 in section 21 and threaded into a flange 28 of section 23. These slots provide for accurate adjustment of section 23 relative to the mill line, such adjustment being effected by set screws threaded into flange 27 and engaging studs 24. Bracket 22 also supports the mill tank and test tank.

Section 23 has a circular flange (not shown) on its upper end serving as a support for a rotary table 30. Table 30 is supported on an annular anti-friction bearing seated in a circular recess, in the upper surface of such flange, and an annular groove in the lower surface of table 30. A cylindrical depending collar 33 on table 30 surrounds the flange on section 23 and has rollers mounted therein with their axes radial of collar 33.

These rollers engage the undersurface of the flange and are adjustable vertically of collar 33 to maintain table 30 parallel to such circular flange.

Table 30 provides for swinging movement of support and manipulator 10 to position crystals 15, 15' with respect to either tubing 11 or the test coupon. The support and manipulator is locked in either of these two positions by a crank 35 pivoted on a post on table 30 and connected to a tapered pin slidable in a guide bushing 39 and engageable in either of a pair of diametrically opposite tapered bushinged apertures in the upper surface of the flange on the upper end of part 23. A coil spring biases the tapered head on the pin to enter the tapered bushinged apertures.

A clamping plate 41 extends diametrically of table 30 at right angles to the diameter intersecting the pin. Plate 41 has a pair of circular apertures at equal distances either side of the axis of rotation of table 30, and these apertures receive cylindrical columns 40 having base flanges beneath plate 41. Studs 44 secure plate 41 to table 30 to clamp the flanges thereagainst. Slide sleeves 45 are slidably mounted on columns 40 by means of vertically spaced ball bushings secured in each sleeve. A strap 47 interconnects the upper ends of columns 40, being recessed to seat the upper ends of the columns and secured thereto by studs 48.

Sleeves 45 form integral parts of a cantilever support 49 including a web 51 interconnecting sleeves 45, spaced parallel webs 52 each extending radially of a sleeve 45, a pair of sleeves 50 at the outer ends of webs 52, an apertured top wall or web 53, and transverse webs 54 interconnecting sleeves 50. Sleeves 50 have fixedly mounted therein vertically spaced ball bushings engaging vertical shafts 55 to allow limited free vertical movement thereof for a purpose to be described.

The upper ends of shafts 55 are rigidly interconnected by a strap 57 recessed to fit these upper ends and connected thereto by studs 58. The lower ends of shafts 55 are threaded through a yoke 25 and have tips 56 projecting downwardly from the yoke. Yoke 25 is centrally apertured to receive anti-friction bearing assemblies 31 rotatably supporting a shaft 72 having a reduced and threaded upper end receiving a nut 32 securing a bearing retainer cap 34 to the shaft, cap 34 having a peripheral flange fitting in a circular groove in the upper surface of yoke 25. Intermediate its ends, shaft 72 has a circular collar 76 integral therewith and seated in a recess in the lower surface of yoke 25. The lower end 77 of shaft 72 is rectangular in cross-section and has a bore 78 extending therethrough parallel to its longer transverse dimension and receiving a relatively long shaft 60 secured against axial movement therein by a set screw 61.

Shaft 60 extends horizontally and parallel to webs 52 through axially spaced ball bushings fixed in sleeves 63 on either side of shaft portion 77 and having their outer ends closed by caps 62. Sleeves 63 are part of an integral carriage 81 shown in detail in FIGS. 3, 4 and 5 as including a pair of curved walls 64 each having a 90 degree V notch 66 in its lower edge bisected by the axis of the associated shaft 55.

Each side of the V notch 66 in each plate 64 has a rectangular recess 68 therein receiving a roller 65 rotatable on a shaft 69. The axes of rollers 65 are normal to each other, and these rollers ride along tubing 11.

The upper surface of carriage 81 has a pair of diametrically opposite oval recesses 89 of limited extent. Tips 56 extend into these recesses and thus limit oscillation of carriage 81 in a horizontal plane about the axis of shaft 72. Carriage 81 can also oscillate in a vertical plane about the axis of shaft 60, and this oscillation is also limited by tips 56 whose lower ends are spaced somewhat from the bottom surfaces of recesses 89.

The oscillation of carriage 81 about the vertical axis of shaft 72 provides for rollers 65 to follow horizontal "ripple" of the welded tubing. Similarly, oscillation of carriage 81 about the horizontal axis of shaft 60 allows rollers 65 to follow vertical "ripple" of the tubing. The limited free vertical movement of shafts 55 in the ball bushings accommodates vertical deflection of "breathing" of tubing 11 and the limited free horizontal movement of the ball bushings on shaft 60 accommodates horizontal deflection or "breathing" of tubing 11. Rollers 65 thus accurately follow all movements of tubing 11 as the latter passes under the rollers and maintain crystals 15, 15' fixed laterally and vertically relative to tubing 11.

Before describing the adjustable supporting means mounting each crystal 15, 15' and its search tube 135, 135' on support 49, reference will be made to the means for raising and lowering this support. This means comprises a fluid pressure actuator 70 including a cylinder 71 and a piston having a piston rod 73 with a threaded upper end. The base 74 of cylinder 71 is bolted to the horizontal leg of an angle bracket 75 having a vertical leg formed with a vertical slot receiving a boss on cylindrical collar 33. This boss is apertured and threaded to receive the threaded stem of a locking clamp 80.

A scale on the side of the slot is cooperable with a pointer secured on table 30. This scale is graduated in tubing sizes so that the vertical position of bracket 75 and actuator 70 relative to table 30 may be adjusted and set in accordance with the size tubing 11 being welded. Vertical adjustment of bracket 75 is effected by a rod 82 threaded through the horizontal leg of bracket 75 and having its lower end engaging table 30. The upper part of rod 82 extends rotatably through a bearing 83 on top wall 53 of support 49, an operating knob 85 being secured to the upper end of shaft or rod 82. By turning knob 85, actuator 70 is adjusted vertically relative to table 30, and is locked in adjusted position by clamp 80.

Stem 73 of actuator 70 extends through top wall 53 of support 49 and through the horizontal leg of an inverted U-shaped strap bracket 84 secured to the upper surface of web or wall 53. Stem 73 is clamped to bracket 84 by nuts 86 on the stem above and below the horizontal leg of the bracket. It will be seen that extension and retraction of actuator 70 will raise and lower support 49, the adjustable lower limit of movement coinciding with a position in which rollers 65 engage the upper quadrants of the particular size tubing 11 being seam welded.

The adjustable supporting and mounting means for the two transducers or crystals are identical, so that only one will be described in detail. Also, the adjustment and mounting means for each transducer is identical with the crystal adjustment and mounting means described in detail in said copending application Serial No. 681,091, to which reference is made for details thereof not shown in the drawings or described hereinafter.

Referring to FIGS. 3, 4 and 5, integral braces 67 interconnect walls 64 of carriage 81 with sleeves 63 and with vertical walls 67 thereof, the latter being formed with oppositely directed, transversely offset pairs of rectangular and vertically extending bosses 87 which are tapped and have plane vertical outer faces. For mounting transducer 15, one pair of bosses is engaged by a mounting plate 90 secured to the bosses by studs 88 threaded into plate 90. As best seen in FIGS. 1A and 2, plate 90 rotatably supports a worm gear 95 engaged by a worm 92 on a shaft 93. Shaft 93 is rotatably mounted in axially spaced bearings supported in correspondingly spaced ears 94 projecting from a bracket 96 pivoted at one end to plate 90. Adjustment of worm 92 into playless engagement with gear 95 is effected by a stud threaded through a bracket on plate 90 and engaging the radially outer ear 94. This stud has a lock nut thereon and bracket 96 is secured in adjusted position by a stud 101 extending through an arcuate slot in the outer end of the bracket and threaded into plate 90. An operating knob 97 is secured to the outer end of shaft 93.

Gear 95 has a 360 degree scale 103 thereon cooperable with a pointer 104 threaded into plate 90 and having a bent outer end extending over gear 95. Gear 95, rotated by turning knob 97, revolves the crystal mounting through a range of 230 degrees about weld 12.

A shouldered stud is threaded into plate 90 adjacent bracket 96 and is formed with a knurled operating head 107. A sleeve on this stud has welded thereto an apertured block 109 through which extends a bent pointer 105 arranged to have its indicating end centered on weld 12. A thumb set screw 111 clamps pointer 105 in its adjusted position. The angular position of the pointer is adjustable by loosening the stud, turning the sleeve, and re-tightening the stud.

Pointer 105 is initially adjusted into alignment with weld 12. Thereby, any variation in the orientation of weld 12 can be readily detected by observation of the relation of weld 12 to pointer 105. Should any such variation be noted, suitable readjustments can be made in the crystal mounting to properly re-position and re-orient the crystal relative to weld 12.

A stud is threaded into gear 95 near its outer periphery and rotatably supports the hub 113 of a radial bar, only bar 110' being shown. A scale 100 is suitably fixed to the outer end of this stud and cooperates with a pointer secured to the radial bar. An annular worm gear 115 is secured to hub 113 and engaged by a worm 116 on a shaft 117 having an operating knob 120. Shaft 117 is rotatably mounted in a bracket 121, identical with bracket 96, pivoted at one end of gear 95 and adjusted and locked in the same manner as bracket 96.

A hinged bracket 125 has a pair of parallel flanges 126 between which the radial bar extends, bracket 125 being pivoted to the radial bar such as 110' by pin 127 extending through flanges 126 and the bar. On one side of pin 127, the radial bar has a recess seating a coil spring bearing against bracket 125. On the other side of pin 127, a stud having an operating head is threaded through the radial bar with its inner end engaging bracket 125.

Bracket 125 embraces search tube 135 which has a rack 131 extending therealong and through a keyway in bracket 125. The bracket is clamped around search tube 135 by a stud 133 rotatably extending through one part of bracket 125 and threaded into the other part thereof. Stud 133 has an operating head 134.

Oblong crystal 15 is supported on the inner end of search tube 135 and the spacing of crystal 15 from tubing 11 is adjusted by a spur gear rotatably mounted in bracket 125 and meshing with rack 131, the spur gear having an operating knob 137. After search tube 135, and thus crystal 15, are longitudinally adjusted by rotating knob 137, stud 133 is screwed in to lock hinged bracket 125 on the search tube. The pivotal mounting of the radial bar in bracket 125, in association with the aforementioned spring and stud, constitutes a "wobble drive" to adjust crystal 15 to the correct electronic right angle. The mounting and adjustment of oblong crystal 15' is identical with that of crystal 15 and the same reference numerals primed have been used to designate the corresponding mounting elements of crystal 15'.

While the support and manipulator has been shown and described, by way of example, as incorporating the dual crystal arrangement of said copending application of Gibson et al., it is equally useful with the single crystal arrangement of said copending application of Allardt et al., Serial No. 681,091.

As the detailed construction and function of mill tank 140 and test tank 16, as well as the manual and automatic control system for the support and manipulator, have been fully shown and described in said copending Allardt et al. application, it is deemed unnecessary to repeat such illustration and description herein.

While a specific embodiment of the invention has been shown and described in detail to illustrate the application of the invention principles, it will be understood that the invention may be embodied otherwise without departing from such principles.

What is claimed is:

1. An apparatus for inspecting a longitudinal seam weld as it is being progressively formed in a work piece subjected to limited oscillating, vertical and/or lateral movement comprising support means mounted adjacent the moving work piece, a yoke means mounted on said support means for limited relative reciprocation with respect to said support and toward and away from the seam weld, a carriage, guide means connected to said carriage and arranged to engage and move with said workpiece, and means for mounting said carriage on said yoke means to permit limited oscillating movement of said carriage about a pair of axes disposed normal to each other, and at least one weld inspection device mounted on said carriage.

2. The invention as defined in claim 1 and including means to permit limited reciprocating movement of said carriage in a direction normal to the reciprocating movement of said yoke means.

3. An apparatus for inspecting a longitudinal seam weld as it is being progressively formed in a work piece subjected to limited unavoidable twisting, oscillating, vertical and/or lateral movement comprising support means mounted adjacent the moving work piece, a yoke means mounted on said support means for limited reciprocation toward and away from the seam weld, a carriage, guide means adapted for engaging the work piece connected to said carriage, and means for mounting said carriage on said yoke means, to permit limited oscillating movement of said carriage about a pair of axes disposed normal to each other, said latter mounting means including a shaft member connected to said yoke for rotation about an upright axis, and a shaft connecting said carriage to said shaft member to provide for rotation of said carriage about the axis of said shaft member, and means for limiting the rotation of said carriage about said upright axis.

4. The invention as defined in claim 3 and including means for said carriage to have limited reciprocating and oscillation movement about the shaft connecting said carriage to said shaft member.

5. Mechanism for supporting and manipulating an inspection device relative to the weld zone of welded tubing being progressively welded in a tubing mill line, said mechanism comprising, in combination, upright column means adjacent the mill line; cantilever support means on said column means normally extending laterally over the tubing and including upright post means; yoke means mounted on said post means for limited reciprocation in an upright plane including the seam weld and said post means; a shaft member mounted in said yoke means for rotation about an upright axis intersecting the weld seam; a carriage; guiding means on said carriage engaging the tubing on both sides of the seam weld; means mounting said carriage on said shaft member beneath said yoke means for oscillation about the shaft member axis; abutment means on said carriage engageable with said post means to limit rotation of said shaft member and oscillation of said carriage; and at least one weld inspection device supported on said carriage.

6. Mechanism for supporting and manipulating an inspection device relative to the weld zone of welded tubing being progressively welded in a tubing mill line, said mechanism comprising, in combination, upright column means adjacent the mill line; cantilever support means on said column means normally extending laterally over the tubing and including upright post means; yoke means mounted on said post means for limited reciprocation in an upright plane including the seam weld and said post means; a shaft member mounted in said yoke means for rotation about an upright axis intersecting the weld seam; a carriage; guiding means on said carriage engaging the tubing on both sides of the seam weld; means mounting said carriage on said shaft member beneath said yoke means whereby said carriage is free to simultaneously oscillate about the shaft member axis and a substantially horizontal axis substantially perpendicular to said upright plane; abutment means on said carriage engageable with said post means to limit rotation of said shaft member and oscillation of said carriage; and at least one weld inspection device supported on said carriage.

7. Mechanism for supporting and manipulating an inspection device relative to the weld zone of welded tubing being progressively welded in a tubing mill line, said mechanism comprising, in combination, upright column means adjacent the mill line; cantilever support means on said column means normally extending laterally over the tubing and including upright post means; yoke means mounted on said post means for limited reciprocation in an upright plane including the seam weld and said post means; a shaft member mounted in said yoke means for rotation about an upright axis intersecting the weld seam; a shaft mounted in said shaft member beneath said yoke means and extending substantially horizontally and substantially perpendicular to said upright plane; a carriage oscillatably mounted on said shaft; guiding means on said carriage engaging the tubing on both sides of the seam weld; abutment means on said carriage engageable with said post means to limit rotation of said shaft member and oscillation of said carriage; and at least one weld inspection device supported on said carriage.

8. Mechanism for supporting and manipulating an inspection device relative to the weld zone of welded tubing being progressively welded in a tubing mill line, said mechanism comprising, in combination, upright column means adjacent the mill line; cantilever support means on said column means normally extending laterally over the tubing and including upright post means; yoke means mounted on said post means for limited reciprocation in an upright plane including the seam weld and said post means; a shaft member mounted in said yoke means for rotation about an upright axis intersecting the weld seam; a shaft mounted in said shaft member beneath said yoke means and extending substantially horizontally and substantially perpendicular to said upright plane; a carriage oscillatably and reciprocably mounted on said shaft; guiding means on said carriage engaging the tubing on both sides of the seam weld; abutment means on said carriage engageable with said post means to limit rotation of said shaft member and oscillation of said carriage; and at least one weld inspection device supported on said carriage.

References Cited in the file of this patent

UNITED STATES PATENTS

| | | |
|---|---|---|
| 2,666,862 | Branson | Jan. 19, 1954 |
| 2,678,559 | Drake | May 18, 1954 |
| 2,799,157 | Pohlman | July 16, 1957 |
| 2,908,161 | Bincer | Oct. 13, 1959 |
| 2,940,305 | Williams et al. | June 14, 1960 |

FOREIGN PATENTS

| | | |
|---|---|---|
| 213,796 | Australia | Mar. 6, 1958 |